United States Patent
Brust et al.

(10) Patent No.: US 9,136,742 B2
(45) Date of Patent: Sep. 15, 2015

(54) ROTOR GEAR MOUNTING ASSEMBLY FOR A GENERATOR AND METHOD

(71) Applicant: Hamilton Sundstrand Corporation, Windsor Locks, CT (US)

(72) Inventors: Eric A. Brust, Machesney Park, IL (US); Ted A. Martin, Byron, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 312 days.

(21) Appl. No.: 13/737,528

(22) Filed: Jan. 9, 2013

(65) Prior Publication Data

US 2014/0191600 A1    Jul. 10, 2014

(51) Int. Cl.
| | |
|---|---|
| *H02K 7/06* | (2006.01) |
| *H02K 7/116* | (2006.01) |
| *H02K 7/00* | (2006.01) |
| *H02K 1/30* | (2006.01) |

(52) U.S. Cl.
CPC .............. *H02K 7/116* (2013.01); *H02K 1/30* (2013.01); *H02K 7/003* (2013.01); *Y10T 29/49012* (2015.01)

(58) Field of Classification Search
CPC .............................. H02K 7/003; H02K 7/116
USPC ................................................. 310/83, 67 R
See application file for complete search history.

(56) References Cited

U.S. PATENT DOCUMENTS

| | | | | |
|---|---|---|---|---|
| 5,061,868 | A * | 10/1991 | Iwazaki et al. | 310/67 R |
| 2004/0222706 | A1 * | 11/2004 | Ickinger | 310/12 |
| 2007/0138881 | A1 * | 6/2007 | Ichizaki | 310/67 R |
| 2012/0299416 | A1 * | 11/2012 | Chen | 310/83 |

* cited by examiner

*Primary Examiner* — Hanh Nguyen
(74) *Attorney, Agent, or Firm* — Cantor Colburn LLP

(57) ABSTRACT

A rotor gear mounting assembly for a generator includes a rotor shaft comprising a first end and a second end. Also included is a magnetic member arrangement operatively coupled to the rotor shaft proximate at least one of the first end and the second end. Further included is a hub portion of the magnetic member arrangement. Yet further included is a rotor gear operatively coupled to the hub portion.

9 Claims, 2 Drawing Sheets

ROTOR GEAR MOUNTING ASSEMBLY FOR A GENERATOR AND METHOD

BACKGROUND OF THE INVENTION

The present invention relates to generators, and more particularly to a rotor gear mounting assembly, as well as a method of mounting a rotor gear to a generator.

Electrical generators typically include a rotor shaft that is driven for rotation and which carries a plurality of field coils or permanent magnets. The generator may include a gear train to drive other components, such as a hydraulic pump, for example, which may be employed to cool the generator or other components of a system. The gear train includes a drive gear that is typically press-fit directly onto the rotor shaft. Direct mounting of the drive gear to the rotor shaft dictates that the drive gear includes a diameter at least as large as that of the rotor shaft, thereby posing packaging challenges.

BRIEF DESCRIPTION OF THE INVENTION

According to one embodiment, a rotor gear mounting assembly for a generator includes a rotor shaft comprising a first end and a second end. Also included is a magnetic member arrangement operatively coupled to the rotor shaft proximate at least one of the first end and the second end. Further included is a hub portion of the magnetic member arrangement. Yet further included is a rotor gear operatively coupled to the hub portion.

According to another embodiment, a method of mounting a rotor gear to a generator is provided. The method includes operatively coupling a magnetic member arrangement to an outer surface of a rotor shaft proximate an end of the rotor shaft. The method also includes operatively coupling a rotor gear to a hub portion of the magnetic member arrangement.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
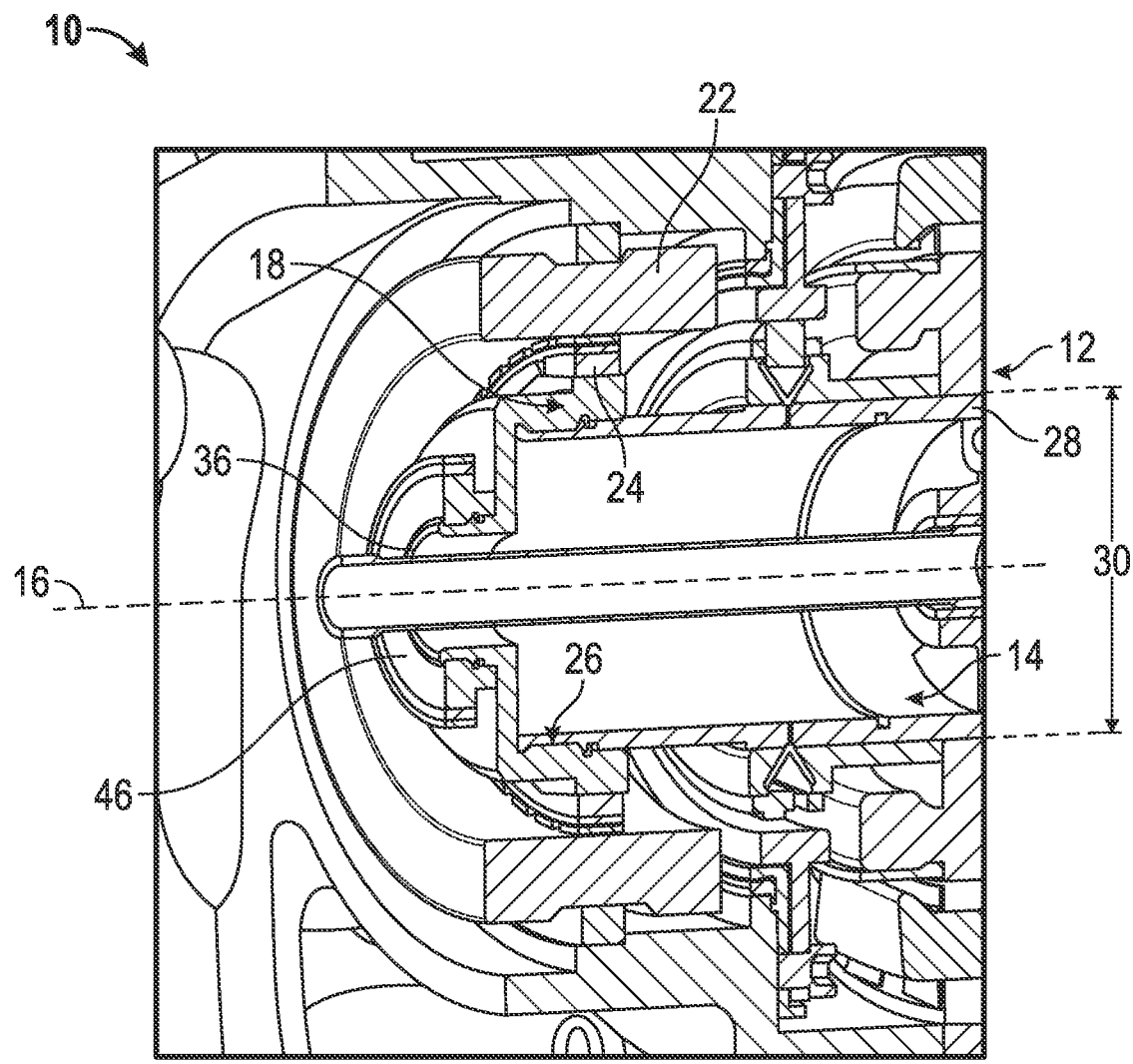
FIG. 1 is a perspective view of a rotor gear mounting assembly of the generator.
Figure 2:
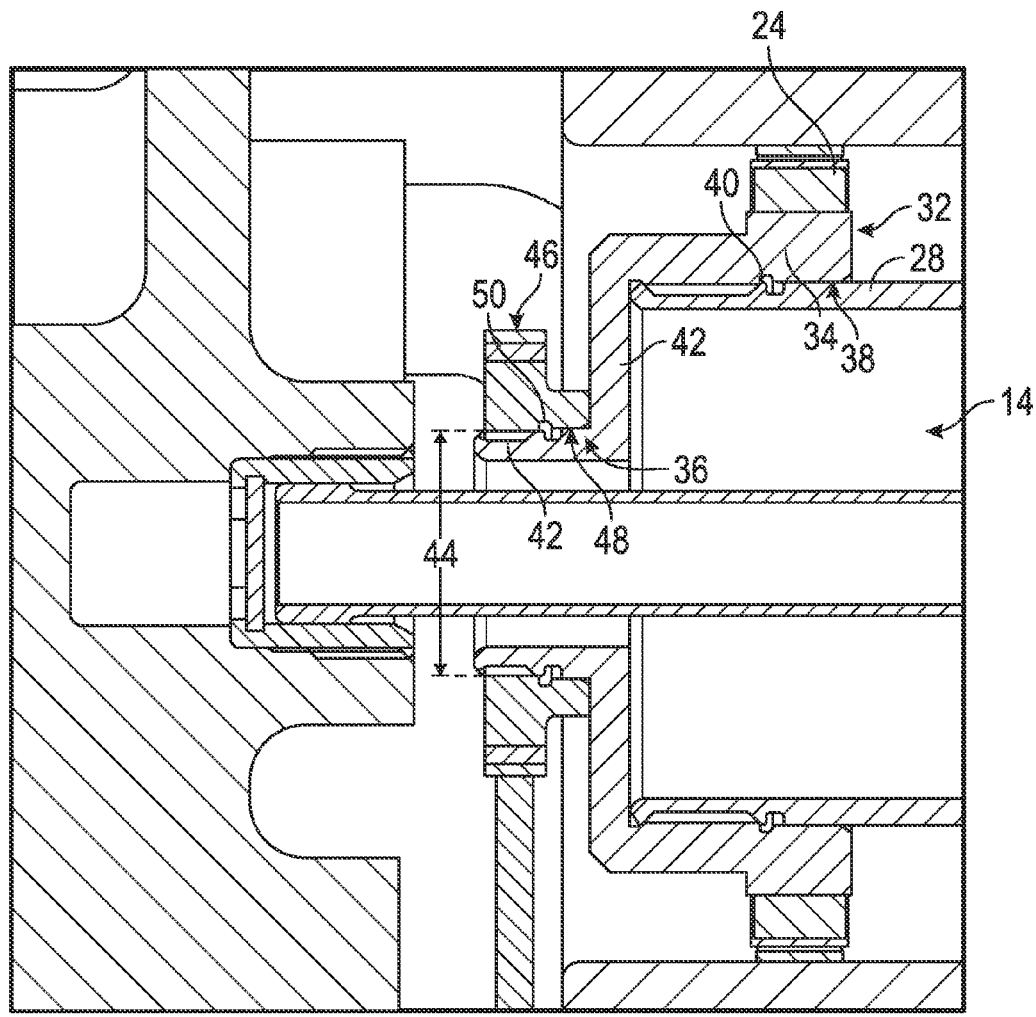
FIG. 2 is a side schematic illustration of the rotor gear mounting assembly.

Referring to FIGS. 1 and 2, selected portions of a generator 10 are illustrated. The generator 10 may be a high speed, variable frequency generator for starting a turbine engine and generating electric current when being driven by the turbine engine, for example.

In the illustrated embodiment, the generator 10 includes a dynamoelectric portion 12 having a rotor shaft 14 that is rotatable about a central axis 16. A rotor 18 is mounted on the rotor shaft 14 to be driven about the central axis 16 within a stator 22 (shown in part). The rotor 18 includes a plurality of magnetic members 24, such as field coils or permanent magnets, circumferentially spaced about the rotor 18 relative to the central axis 16. The general arrangement of dynamoelectric machines is known and may vary from that shown in the illustrated examples.

The rotor shaft 14 includes an end region 26 having a shaft outer surface 28 that includes an outer diameter 30, also referred to herein as a first diameter. It is to be appreciated that although a single end region is illustrated, the rotor shaft 14 includes a first end and a second end. It is contemplated that the embodiments described herein may be employed at the first end and/or the second end.

Disposed proximate the end region 26 is a magnetic member arrangement 32 that comprises or houses the plurality of magnetic members 24 described above. The magnetic member arrangement 32 includes a main portion 34 and a hub portion 36. The main portion 34 is operatively coupled to the shaft outer surface 28 of the rotor shaft 14 proximate the end region 26. The operative coupling between the components is typically facilitated by a threaded engagement of the main portion 34 with the rotor shaft 14. To assist a user with locating and positioning of the magnetic member arrangement 32 during installation or removal of the magnetic member arrangement 32, a shaft pilot component 38 is included. The shaft pilot component 38 comprises a diameter that corresponds to a magnetic member pilot component 40 which comprises a matching diameter.

The hub portion 36 is integrally formed with the main portion 34 and connected thereto with a connecting wall 42 that extends radially inwardly from the main portion 34 to the hub portion 36. The hub portion 36 is disposed axially beyond the end region 26 of the rotor shaft 14 and is circular in geometry. The hub portion includes a hub outer surface 42 that includes an outer diameter 44, also referred to herein as a second diameter. As shown, the second diameter, or outer diameter 44, is less than the first diameter, or outer diameter 30. More particularly, the outer diameter of the hub portion 36 is smaller than the outer diameter of the rotor shaft 14. Such a configuration advantageously permits coupling of a gear of smaller dimensions, which may be beneficial in certain applications.

A rotor gear 46 is included as part of a gear train for interacting with one or more other gears (not illustrated) to drive additional components. The type and number of gears that may interact with the rotor gear 46 may vary based on the particular application of use. Additionally, the additional component(s) driven directly or indirectly by the rotor gear 46 may vary, with one example being a hydraulic pump that includes a pump gear that interacts with the rotor gear 46. However, it is to be understood that numerous other components may benefit from mechanical interaction with the rotor gear 46.

The rotor gear 46 is operatively coupled to the hub outer surface 42 of the hub portion 36. The operative coupling between the components is typically facilitated by a threaded engagement of the rotor gear 46 with the hub portion 36. To assist a user with locating and positioning of the rotor gear 46 during installation or removal of the rotor gear 46, a hub pilot component 48 is included. The hub pilot component 48 comprises a diameter that corresponds to a rotor gear pilot component 50 which comprises a matching diameter.

Figure 3:
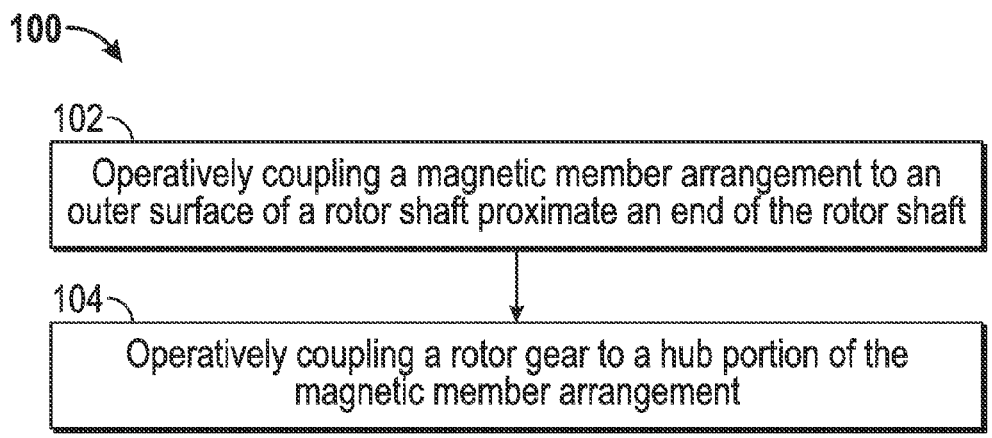
FIG. 3 is a flow diagram illustrating a method of mounting a rotor gear to the generator.

A method of mounting a rotor gear to a generator 100 is also provided, as illustrated in FIG. 3 and with reference to FIGS. 1 and 2. The generator 10 and components included for mounting of the rotor gear 46 to the hub portion 36 have been previously described and specific structural components need not be described in further detail. The method of mounting a rotor gear to a generator 100 includes operatively coupling 102 a magnetic member arrangement to an outer surface of a rotor shaft proximate an end of the rotor shaft. The rotor gear is operatively coupled 104 to a hub portion of the magnetic member arrangement. As described in detail above, the operative coupling of the magnetic member arrangement to the rotor shaft and of the rotor gear to the hub portion is typically facilitated by a threaded engagement between the respective components.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotor gear mounting assembly for a generator comprising:
   a rotor shaft comprising a first end and a second end;
   a magnetic member arrangement operatively coupled to the rotor shaft proximate at least one of the first end and the second end;
   a hub portion of the magnetic member arrangement, wherein the rotor shaft comprises a shaft outer surface having a first diameter, and wherein the hub portion comprises a hub outer surface having a second diameter that is less than the first diameter; and
   a rotor gear operatively coupled to the hub portion.

2. The rotor gear mounting assembly of claim 1, wherein the magnetic member arrangement is threaded onto the rotor shaft.

3. The rotor gear mounting assembly of claim 1, wherein the the hub portion is threaded onto the rotor gear.

4. The rotor gear mounting assembly of claim 1, wherein the hub portion is disposed axially beyond the first end of the rotor shaft.

5. The rotor gear mounting assembly of claim 1, wherein the hub portion is disposed axially beyond the second end of the rotor shaft.

6. A method of mounting a rotor gear to a generator comprising:
   operatively coupling a magnetic member arrangement to an outer surface of a rotor shaft proximate an end of the rotor shaft, wherein the rotor shaft comprises a shaft outer surface having a first diameter, and wherein the hub portion comprises a hub outer surface having a second diameter that is less than the first diameter; and
   operatively coupling a rotor gear to a hub portion of the magnetic member arrangement.

7. The method of mounting a rotor gear to a generator of claim 6, further comprising operatively coupling the rotor gear to the hub portion at an axial location beyond the end of the rotor shaft.

8. The method of mounting a rotor gear to a generator of claim 6, wherein operatively coupling the magnetic member arrangement to the rotor shaft comprises engaging the magnetic member arrangement with the outer surface of the rotor shaft by threading the magnetic member arrangement onto the rotor shaft.

9. The method of mounting a rotor gear to a generator of claim 6, wherein operatively coupling the rotor gear to the hub portion comprises engaging the rotor gear with the hub portion by threading the hub portion onto the rotor gear.

* * * * *